(12) United States Patent
Tsukahara

(10) Patent No.: US 9,937,788 B1
(45) Date of Patent: Apr. 10, 2018

(54) FUEL TANK

(71) Applicant: YACHIYO INDUSTRY CO., LTD., Saitama (JP)

(72) Inventor: Shunsuke Tsukahara, Tochigi (JP)

(73) Assignee: Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 15/566,649

(22) PCT Filed: Feb. 18, 2016

(86) PCT No.: PCT/JP2016/054648
§ 371 (c)(1),
(2) Date: Oct. 13, 2017

(87) PCT Pub. No.: WO2016/167018
PCT Pub. Date: Oct. 20, 2016

(30) Foreign Application Priority Data

Apr. 15, 2015 (JP) ................... 2015-083145

(51) Int. Cl.
| | | |
|---|---|---|
| *B65D 88/62* | (2006.01) | |
| *B60K 15/077* | (2006.01) | |
| *B60K 15/03* | (2006.01) | |

(52) U.S. Cl.
CPC .... *B60K 15/077* (2013.01); *B60K 2015/0346* (2013.01)

(58) Field of Classification Search
CPC ...... B65D 79/005; B65D 11/22; B65D 33/02; B65D 90/52; B65D 1/0223; B60K 15/03177; B60K 15/077; B60K 2015/0344; B60K 15/03; B60K 15/073; B60K 2015/03453

USPC ... 220/562, 53, 564, 4.13, 900, 566, 560.01, 220/4.12, 4.14, 4.15; 137/571, 575, 590; 280/834, 836–839
See application file for complete search history.

(56) References Cited

U.S. PATENT DOCUMENTS

| | | | |
|---|---|---|---|
| 2,407,455 A | * | 9/1946 | Shakesby ............... B64D 37/02 220/653 |
| 4,526,286 A | | 7/1985 | Jung et al. |
| 4,638,836 A | | 1/1987 | Bailey |
| 4,708,170 A | | 11/1987 | Bailey |

(Continued)

FOREIGN PATENT DOCUMENTS

| | | |
|---|---|---|
| JP | 53-87319 U | 7/1978 |
| JP | 56-87926 U | 7/1981 |

(Continued)

OTHER PUBLICATIONS

International Search Report from PCT/JP2016/054648 dated May 10, 2016, by Japan Patent Office (2 pages).

*Primary Examiner* — Shawn M Braden
(74) *Attorney, Agent, or Firm* — Capitol City TechLaw, PLLC; Samuel P. Burkholder

(57) ABSTRACT

A fuel tank has a welded member that is welded inside a fuel tank body. The welded member includes a welded face that is welded on at least one of a first tank face and a second tank face which faces the first tank face, of the fuel tank body, and wherein the welded face includes a facing side in a concave shape that faces a given point determined based on a displacement of distance between the first tank face and the second tank face when the fuel tank body receives an internal pressure.

6 Claims, 10 Drawing Sheets

(56) References Cited

U.S. PATENT DOCUMENTS

| | | | | |
|---|---|---|---|---|
| D355,854 S | * | 2/1995 | Baron | D9/528 |
| 5,876,599 A | * | 3/1999 | Sylvester | B01D 29/21 |
| | | | | 210/232 |
| 6,338,420 B1 | * | 1/2002 | Pachciarz | B60K 15/03177 |
| | | | | 220/4.13 |
| 7,427,000 B2 | * | 9/2008 | Austerhoff | B60K 15/03006 |
| | | | | 220/4.14 |
| 7,568,592 B2 | * | 8/2009 | Miyauchi | B60K 15/077 |
| | | | | 220/4.14 |
| 2008/0053993 A1 | * | 3/2008 | Yang | B63B 25/16 |
| | | | | 220/4.12 |

FOREIGN PATENT DOCUMENTS

| | | |
|---|---|---|
| JP | 58-145521 A | 8/1982 |
| JP | 61-249825 A | 11/1986 |
| JP | 2015-58715 A | 3/2015 |

* cited by examiner

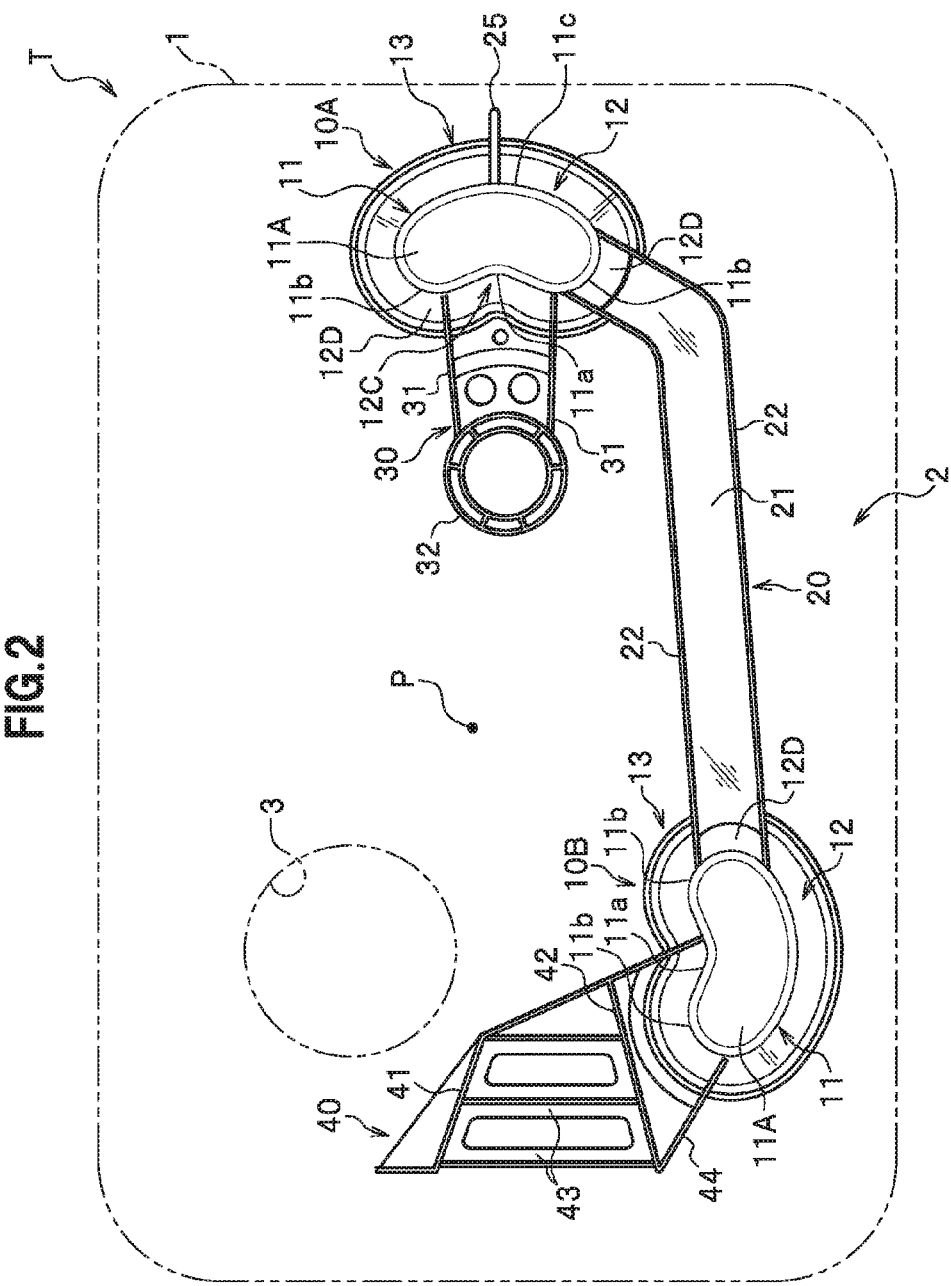

FUEL TANK

TECHNICAL FIELD

The invention relates to a fuel tank.

BACKGROUND ART

For example, Patent Document 1 discloses a fuel tank having a fuel tank body and a columnar member. Both ends of the columnar member are welded to fix opposed inner faces of the fuel tank body. The columnar member is, for example, in a cylindrical shape or an elliptic shape in a cross section. Members that are welded in the fuel tank body are, in addition to the columnar member, for example, a wave-dissipation plate and a bracket. The members to be welded on the inner faces of the fuel tank body are referred to as "welded members" hereinbelow.

PRIOR ART DOCUMENTS

Patent Documents

Patent Document 1: U.S. Pat. No. 7,455,190

SUMMARY OF THE INVENTION

Problems to be Solved by the Invention

The fuel tank is expanded or contracted due to a change in ambient temperature or a temperature change by heat from an exhaust system. Especially, in a case where the fuel tank is made of resin, the fuel tank is susceptible to such external factors. If the fuel tank is deformed, the welded faces between the welded members and the fuel tank receive stress. For example, in the case of the columnar member described in Patent Document 1, each welded face is in a ring shape. If the fuel tank is deformed, one point in the outer edge of the welded face may locally receive a large stress.

The invention intends to solve such a problem and provides a fuel tank that effectively disperses a stress applied on welded members to have superior durability.

Means to Solve the Problems

To solve the problem above, the invention provides a fuel tank having a welded member that is welded inside a fuel tank body, wherein the welded member includes a welded face that is welded on at least one of a first tank face and a second tank face which faces the first tank face, of the fuel tank body, and wherein the welded face is in a kidney-shape defined by a first facing side in a concave shape that faces a given point determined based on a displacement of distance between the first tank face and the second tank face when the fuel tank body receives an internal pressure, a pair of second facing sides in a convex shape that are continuous to both ends in an extending direction of the first facing side and relatively protrude toward the given point with respect to the first facing side, and a connecting side that is curved in a same orientation as the first facing side and connects the pair of second facing sides to each other.

The "given point" is referred to as a point where distance varies between the first tank face and the second tank face according to expansion or contraction of the fuel tank. According to the invention, since the concave facing side is arranged to face the given point, a stress applied on the welded face is dispersed. This prevents one point in the outer edge of the welded face from locally receiving the stress, to allow for obtaining a fuel tank having superior durability.

Further, the welded member preferably includes: a bottom; a cylindrical body continuous to the bottom; and an annular flange that extends laterally from an end of the body, wherein the bottom includes the welded face that is welded on one of the first tank face and the second tank face, and wherein the flange includes the welded face that is welded on the other of the first tank face and the second tank face.

According to the configuration, since the bottom and the flange of the welded member are respectively welded on the first tank face and the second tank face, the strength of the fuel tank is improved.

Still further, preferably, a welded area of the bottom is approximately the same as a welded area of the flange. According to the configuration, the welded member is fixed in a well-balanced manner.

Furthermore, a communication hole through which an inside and an outside of the body communicate to each other is preferably formed in the body. According to the configuration, the inner space of the welded member is used as a reservoir space for a fuel.

Moreover, ribs that protrude from the welded face are preferably formed on the welded face before welding. According to the configuration, the welded area is increased compared with the case having no ribs, to give more increased welding strength.

The respective ribs are preferably formed annularly outward from the center of the welded face, and an outermost rib is lower than the ribs formed inside the outermost rib.

For example, when the fuel tank receives an internal pressure, the outer edge of the welded face receives a large stress. Therefore, if the outer edge of the welded face is welded strongly, damage in an inner face of the fuel tank may be increased with damage in the welded face. However, setting the outermost rib to be lower than any other rib as in the invention, allows the damage in the inner face of the fuel tank body to be decreased even if the welded face comes off due to the internal pressure in the fuel tank.

Advantageous Effects of the Invention

The fuel tank of the invention effectively disperses a stress applied on the welded members to have superior durability.

BRIEF DESCRIPTION OF THE DRAWINGS

FIG. 2 is a plan view of the fuel tank as viewed from above therethrough;

EMBODIMENTS OF THE INVENTION

Figure 1:
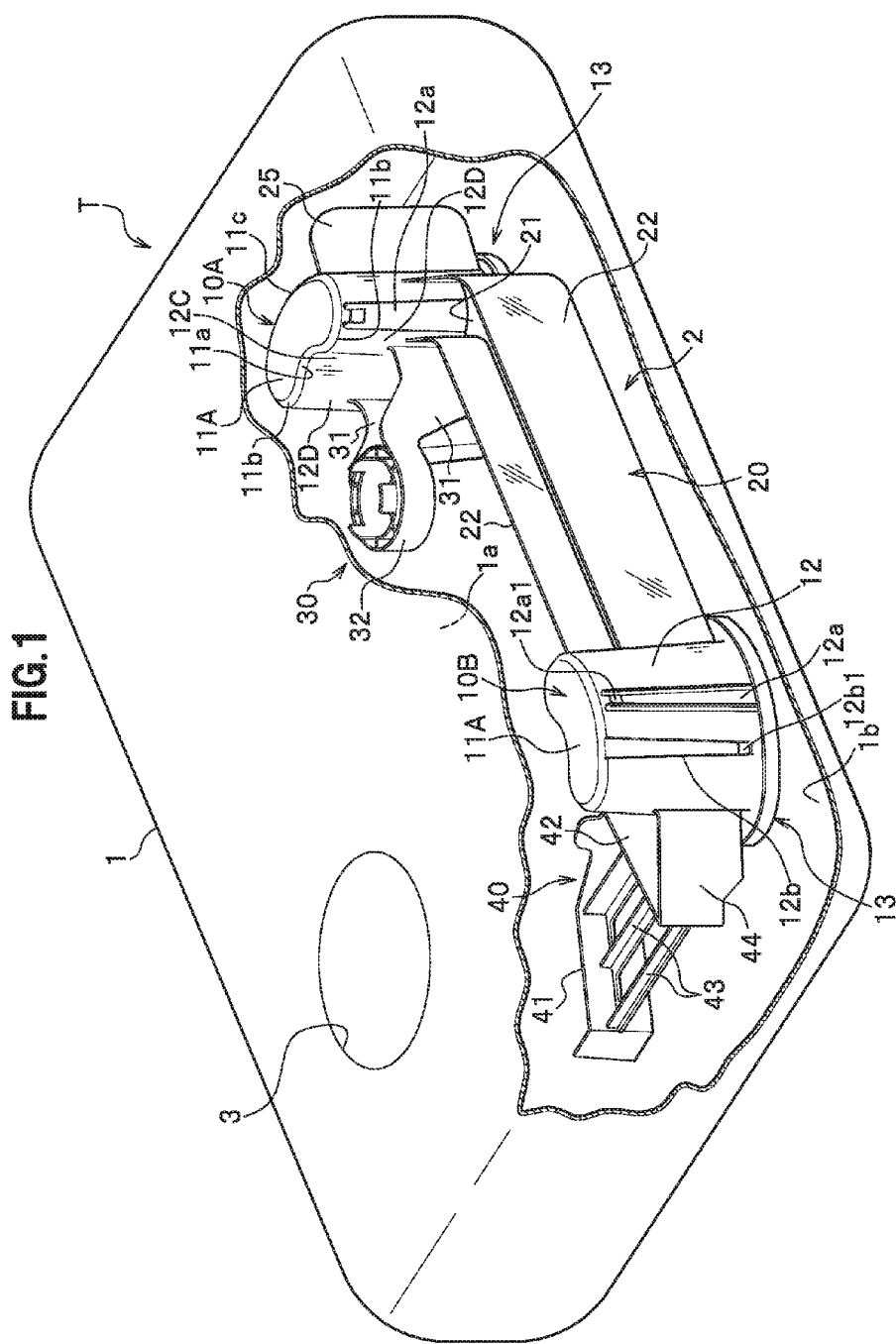
FIG. 1 is a perspective view of a fuel tank as viewed from above therethrough according to a first embodiment of the invention.

Embodiments of the invention will be described in detail with reference to the drawings. Note that, in the description of each embodiment, the same member is marked with the same reference numeral and its detailed description will be omitted.

First Embodiment

A fuel tank T shown in FIGS. 1 and 2 is mounted on a means of transportation such as an automobile, a motorcycle and a boat, and includes a fuel tank body 1 and a bracket 2 mounted in the fuel tank body 1. A pump mounting hole 3 is formed in a first tank face 1a of the fuel tank body 1. A pump (not shown) that pumps out the fuel outside the tank is connected to the pump mounting hole 3.

The fuel tank body 1 is a hollow container for reserving a fuel such as gasoline, and, for example, is made of a thermoplastic resin. The fuel tank body 1 is produced, for example, by blow molding.

The bracket 2 is mounted in the fuel tank body 1 when the fuel tank body 1 is produced, and, for example, is made of a thermoplastic resin. The bracket 2 includes a pair of columnar welded members 10A, 10B. A wave-dissipation plate 20 is arranged between the welded members 10A and 10B. The welded member 10A includes a receiving portion 30 that supports an internal member such as a cut valve (not shown). Further, the welded member 10B includes a supported portion 40 that is used at the time of welding the bracket 2 on the fuel tank body 1.

Figure 3A:
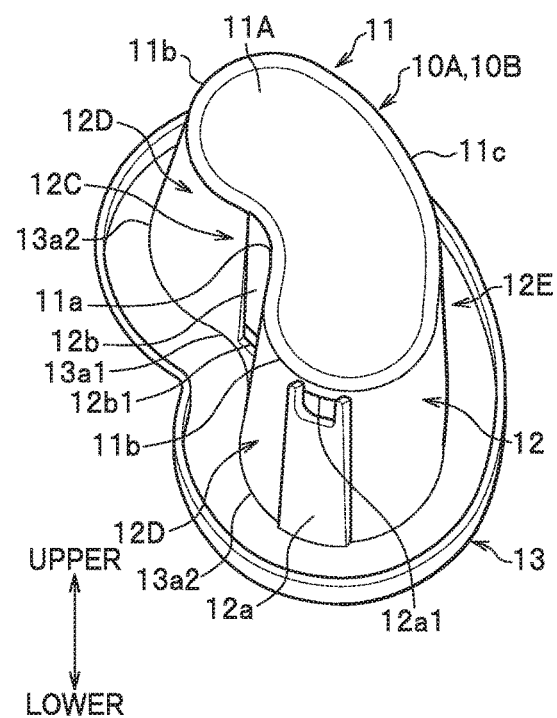
FIG. 3A is a perspective view of a welded member.

Since the pair of welded members 10A, 10B has the same basic structure, the welded member 10A will be described in the following description and the welded member 10B will be described as necessary. As shown in FIG. 2, the welded member 10A has a substantially kidney shape as viewed from above, and has the central portion of one end recessed toward the other end. As shown in FIG. 3A, the welded member 10A has a bottom 11, a body 12 continuous to the bottom 11, and a flange 13 continuous to the body 12. Note that, in FIG. 3, the welded member 10A (10B) is shown alone, and the wave-dissipation plate 20 and the receiving portion 30 attached to the welded member 10A are omitted.

Figure 3B:
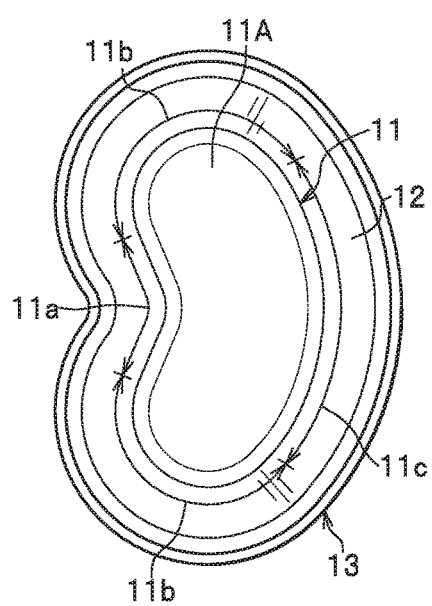
FIG. 3B is a plan view of the welded member.

As shown in FIGS. 3A and 3B, the bottom 11 includes a flat welded face 11A. The welded face 11A is welded on the first tank face 1a (see FIG. 1) of the fuel tank body 1. The welded face 11A is defined by a first facing side 11a in a concave shape, second facing sides 11b in a convex shape continuous to both sides in the extending direction of the first facing side 11a, and a connecting side 11c that connects the second sides 11b to each other. The first facing side 11a is curvedly recessed toward the connecting side 11c. That is, the first facing side 11a protrudes toward the connecting side 11c. On the other hand, the second facing sides 11b peripheral to the first facing side 11a protrude in a direction away from each other. The connecting side 11c is formed in a curved shape in the same orientation as the first facing side 11a. Note that the first facing side 11a corresponds to a "concave facing side" in claims.

As shown in FIG. 3A, the body 12 is in a curved outer shape to follow the curved shapes of the sides defining the welded face 11A. On one side of the body 12, a concave face 12C is formed that follows the first facing side 11a of the welded face 11A. Further, on both sides of the concave face 12C, convex faces 12D that follow the second facing sides 11b of the welded face 11A are formed to be continuous to the concave face 12C. Still further, on the other side of the body 12, a curved face 12E that follows the connecting side 11c of the welded face 11A is formed to be continuous to the convex faces 12D.

The body 12 has an outer peripheral face that slightly inclines in a skirt shape from the bottom 11 toward the flange 13. On the outer peripheral face of the body 12, a vertical convex rib 12a and a vertical concave rib 12b are formed that extend in the axial direction of the body 12 so as to be spaced apart circumferentially. A communication hole 12a1 is formed at the upper end of the vertical convex rib 12a. Further, a communication hole 12b1 is formed at the lower end of the vertical concave rib 12b. The space outside the body 12 (space in the fuel tank body 1) is communicated with the space inside the body 12 through the communication holes 12a1, 12b1.

Figure 3C:
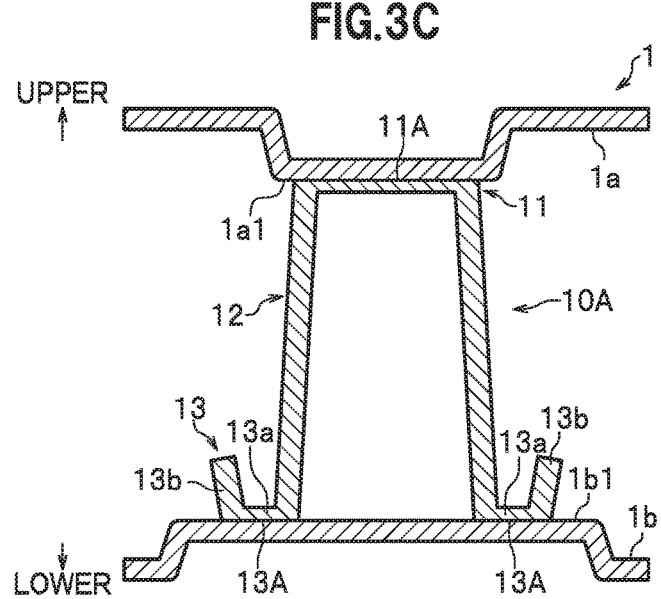
FIG. 3C is a cross-sectional view of a fuel tank body and the welded member.
Figure 4A:
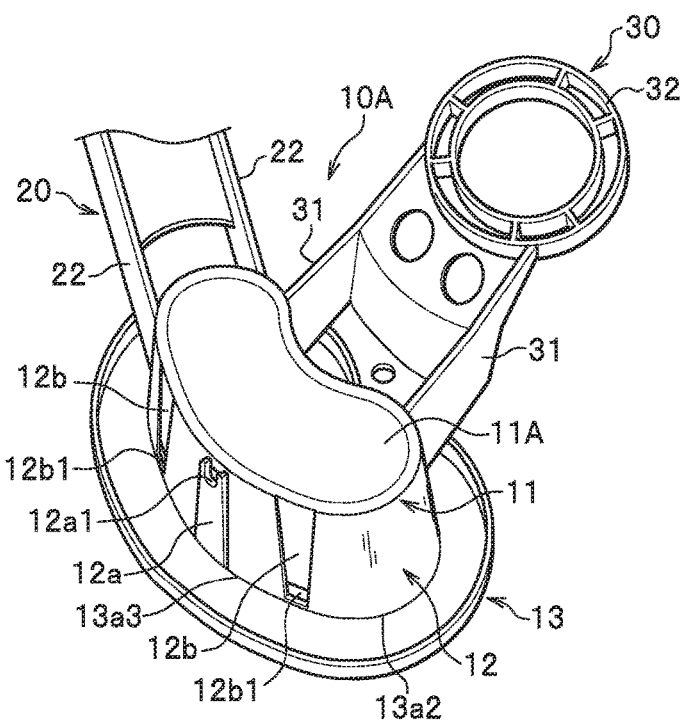
FIG. 4A is a perspective view of one of the welded members as viewed from above.
Figure 4B:
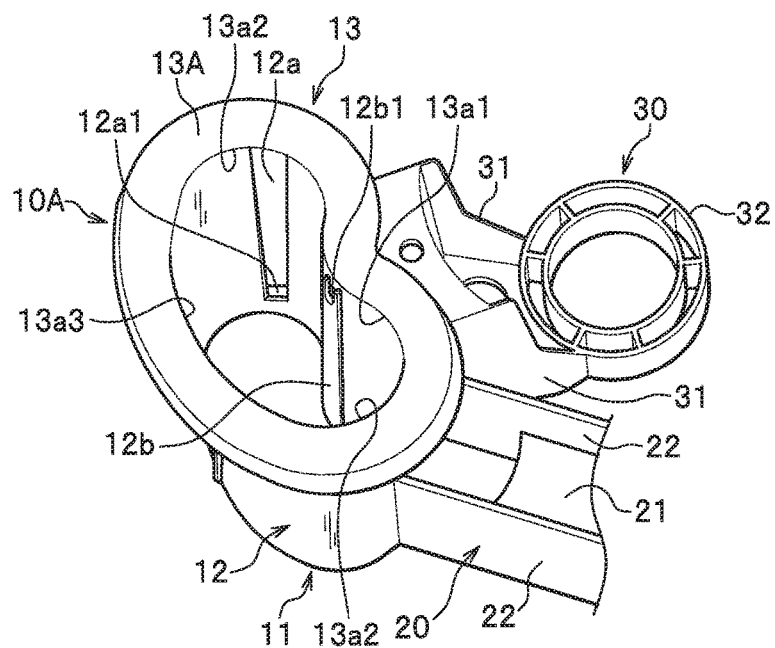
FIG. 4B is a perspective view of the welded member as viewed from below.

The flange 13 includes a flat annular welded face 13A on its bottom face (see FIG. 3C and FIG. 4B). The welded face 13A is welded on the second tank face 1b (see FIG. 1) of the fuel tank body 1. The flange 13 is integrally formed with the body 12 at the lower end of the body 12, and includes an annular protruding portion 13a and an upright portion 13b. The protruding portion 13a substantially evenly extends from the lower end of the body 12 outward to form the welded face 13A on its lower face. As shown in FIG. 3A and FIG. 4B, the protruding portion 13a includes a first facing side 13a1 in a concave shape that follows the concave face 12C of the body 12, second facing sides 13a2 in a convex shape that follow the convex faces 12D of the body 12, and a connecting side 13a3 that follows the curved face 12E of the body 12. As shown in FIG. 3C, the upright portion 13b continues to the upright portion 13a and extends upward. Note that, though not shown, a vertical reinforcing rib may be arranged between the protruding portion 13a and the outer face of the body 12.

In the embodiment, a welded area of the welded face 11A of the bottom 11 as described above is set to be substantially equal to a welded area of the welded face 13A of the flange 13.

As shown in FIG. 3C, the welded member 10A is welded between the first tank face 1a and the second tank face 1b of the fuel tank body 1. In the example shown in FIG. 3C, the welded face 11A of the bottom 11 is welded to a stepped portion 1a1 that is formed sunken on the first tank face 1a. Further, the welded face 13A of the flange 13 is welded to a stepped portion 1b1 that is formed raised on the second tank face 1b. In other words, the welded member 10A is welded across the stepped portions 1A1, 1b1 that are formed to reinforce the fuel tank body 1.

As shown in FIG. 2, the welded member 10A is mounted in the fuel tank body 1 so that the first facing side 11a and the second facing sides 11b face a given point P in the fuel tank body 1. The second facing sides 11b are arranged to relatively protrude toward the given point P more than the first facing side 11a.

The given point P in FIG. 2 is a point where a distance between the first tank face 1*a* and the second tank face 1*b*, which face each other, varies according to expansion or contraction of the fuel tank T. The given point P is appropriately determined based on a displacement of the distance between the first tank face 1*a* and the second tank face 1*b*. For example, in the embodiment, the given point P is set to a point at the substantially central position of the fuel tank body 1 where the displacement is relatively large. The given point P is not necessarily set to a point having the maximum displacement.

Figure 5A:
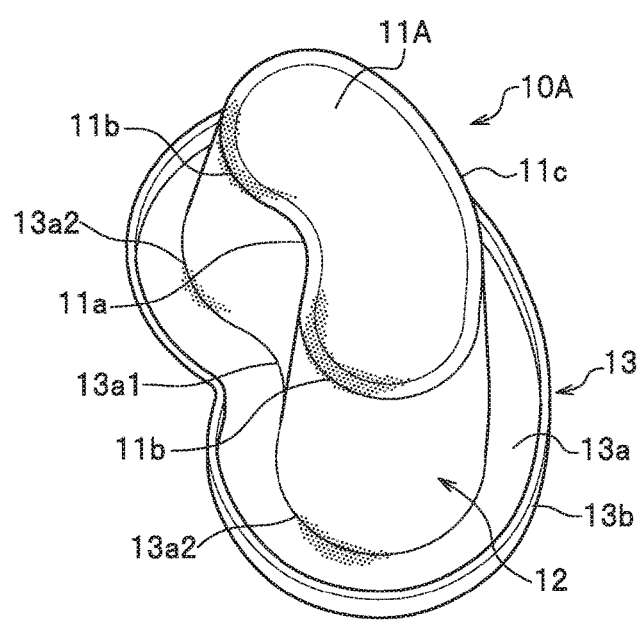
FIGS. 5A and 5B are schematic diagrams showing a stress applied on the welded member when the fuel tank is deformed.
Figure 5B:
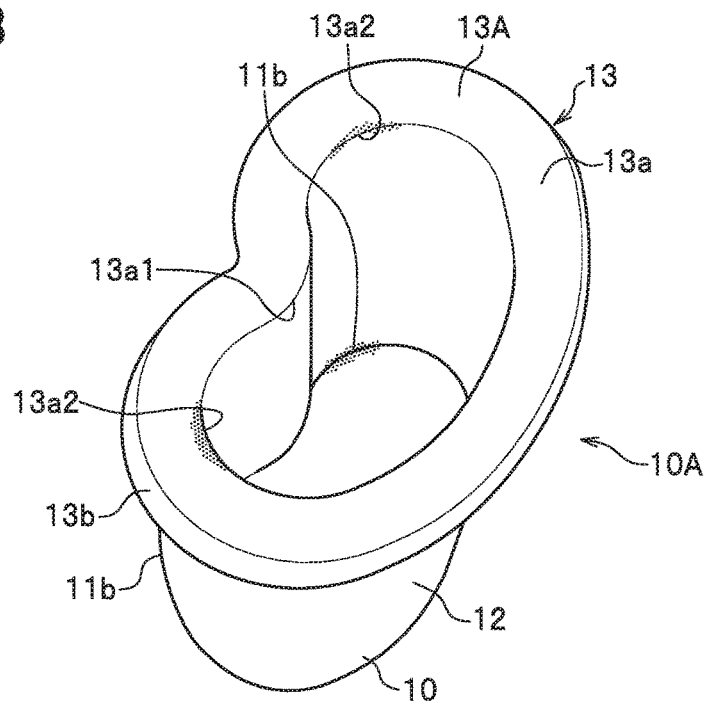

FIGS. 5A and 5B are schematic diagrams showing a stress distribution on the welded member 10A in a state that the welded member 10A is welded on the first tank face 1*a* and the second tank face 1*b*. In FIGS. 5A and 5B, portions that receive a large stress are shown with dot patterns. As described above, since the first facing side 11*a* of the welded member 10A is arranged so as to face the given point P and the second facing sides 11*b* to be peripheral to the first facing side 11*a*, the welded face 11A receives a larger stress along the second facing sides 11*b* respectively than along the first facing side 11*a*. In short, the welded face 11A has the stress dispersed on the second facing sides 11*b* across the first facing side 11*a*.

Further, also in the welded face 13A of the flange 13, the second facing sides 13*a*2 receive a larger stress than the first facing side 13*a*1. That is, the welded face 13A has the stress dispersed on the second facing sides 13*a*2 across the first facing side 13*a*1.

As shown in FIG. 2, the welded member 10B has the second facing sides 11*b* arranged so as to have a different positional relationship (different distance) from each other to the given point P. Also in this case, since the second facing sides 11*b* are peripheral to the first facing side 11*a*, as with the welded member 10A, the welded face 11A of the welded member 10B has its stress dispersed on the second facing sides 11*b*. Further, the welded face 13A of the welded member 10B has its stress dispersed on the second facing sides 13*a*2 (see FIGS. 5A and 5B).

Note that the welded member 10B is arranged so that the given point P is positioned in an oblique direction as viewed from above. In other words, the welded member 10B is arranged so that the lengths of the two imaginary lines connecting the given point P with the pair of second facing sides 11*b*, 11*b* are different. On the other hand, the welded member 10A is arranged so that the given point P is positioned at the front viewed from above. In other words, the welded member 10A is arranged so that the lengths of the two imaginary lines connecting the given point P with the pair of second facing sides 11*b*, 11*b* are the same. If the welded member 10B is arranged in front of the given point P as with the welded member 10A, the stress will be dispersed in a well-balanced manner.

As shown in FIGS. 1, 2, 4A and 4B, the welded member 10A supports one end of the wave-dissipation plate 20. Further, the receiving portion 30 is attached to the welded member 10A.

As shown in FIGS. 1 and 2, the wave-dissipation plate 20 includes a plate-shaped base portion 21 and plate-shaped wave-dissipation members 22 that are attached to the base portion 21 at both ends. Both ends in the extending direction of the wave-dissipation plate 22 respectively extend toward the welded member 10A and the welded member 10B. One end of the wave-dissipation member 22 is fixed on the convex face 12D of the body 12 of the welded member 10A. Further, the other end of the wave-dissipation member 22 is fixed on the convex face 12D of the body 12 of the welded member 10B. The wave-dissipation member 22 is fixed by welding, with an adhesive, or the like.

The receiving portion 30 includes legs 31 and an annular support portion 32 formed at the distal ends of the legs 31. The base ends of the legs 31 are fixed on the outer face of the body 12 of the welded member 10A. In the embodiment, as shown in FIG. 2, the distal ends of the legs 31 are fixed across the convex faces 12D of the body 12. The legs 31 are fixed by welding, with an adhesive, or the like. The support portion 32 supports a cut valve or the like (not shown) to be arranged in the fuel tank body 1.

Note that, as shown in FIG. 2, the welded member 10A has a plate-shaped wave-dissipation member 25 attached on the curved face 12E of the body 12 on a side opposite to the side where the receiving portion 30 is attached.

The supported portion 40 is supported by a lifting device 5 (see FIG. 6) to be described later so as to assemble the bracket 2 at the time of producing the fuel tank body 1. As shown in FIGS. 1 and 2, the supported portion 40 includes a pair of base portions 41, 42 spaced apart from each other, a plurality of wave-dissipation portions 43 that connect the pair of base portions 41, 42 together, and a connecting portion 44 that is connected on the body 12 of the welded member 10B.

Next, referring mainly to FIGS. 6A and 6B, a method of mounting the bracket 2 by a manufacturing device will be described. Note that the lifting device 5 is used to mount the bracket 2. Directions referred to in the following description are set for convenience in describing the configuration of the lifting device 5, and are not intended to identify the configuration of the lifting device 5.

Figure 6A:
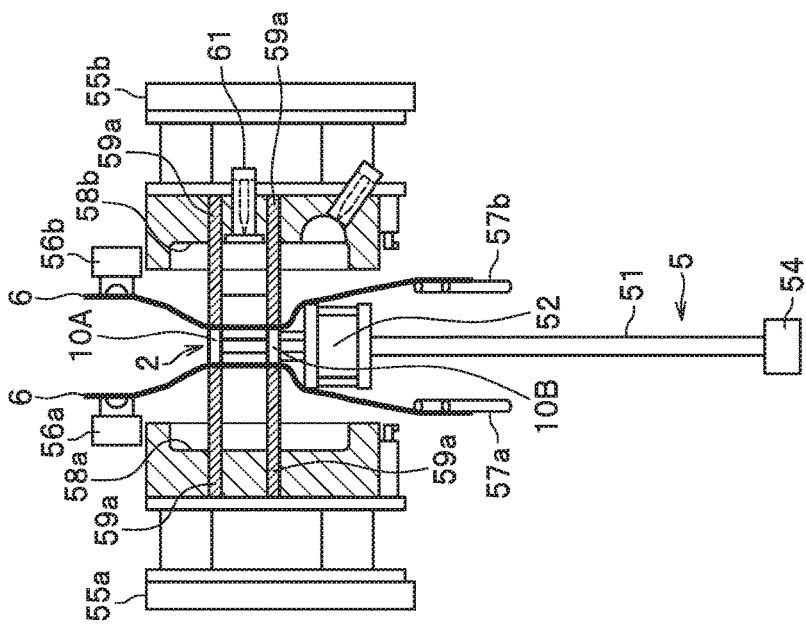
FIGS. 6A and 6B are explanatory diagrams illustrating a method of mounting a bracket.

As shown in FIG. 6A, the lifting device 5 includes a support rod 51, a seat 52 and a clamp mechanism 53. The lifting device 5 detachably supports the bracket 2 and moves up and down. The support rod 51 is a rod-shaped member that extends vertically. The support rod 51 is supported by a slide mechanism 54 so as to be vertically slidable. The clamp mechanism 53 fixes the bracket 2 on the upper face of the seat 52.

The bracket 2 according to the embodiment is mounted in the fuel tank body 1 when the fuel tank body is blow-molded. The manufacturing device for the fuel tank body 1 includes a pair of molds 55*a*, 55*b*, a pair of chucks 56*a*, 56*b*, and a pair of expansion pins 57*a*, 57*b*, in addition to the lifting device 5 described above.

The molds 55*a*, 55*b* are arranged so as to be movable along an inward and outward direction (opening and closing direction of molds). Molding faces 58*a*, 58*a* for molding the fuel tank body 1 are formed recessed on the inner faces of the molds 55*a*, 55*b*. Joining cylinders 59*a* that are expandable along the inward and outward direction (opening and closing direction of molds) are arranged at approximately central portions of the molds 55*a*, 55*b*. The right and left joining cylinders 59*a*, 59*a* makes a set. In the example, two sets are arranged apart from each other vertically. The joining cylinders 59*a* extend mutually to press a parison 6 from outside so as to join (weld) the bracket 2 inside the parison 6 (see FIG. 6B).

A pair of pinches 55*a*1, 55*b*1 that is expandable along the inward and outward direction (opening and closing direction of molds) is arranged at the lower end of the molds 55*a*, 55*b*. The pinches 55*a*1, 55*b*1 extend mutually to press and close the lower end of the parison 6.

The mold 55*b* includes a first blow pin 61 through which air is supplied into the parison 6 and a second blow pin 62 through which the air in the parison 6 is discharged outside.

The first blow pin 61 is arranged retractably at the central portion of the mold 55b. The second blow pin 62 is arranged retractably at the lower corner of the mold 55b.

The chucks 56a, 56b are arranged above the molds 55a, 55b so as to be movable along the inward and outward direction (opening and closing direction of molds). The chucks 56a, 56b hold the upper end of the cylindrical or sheet-shaped parison 6 to suspend the parison 6 between the molds 55a, 55b. Further, the chucks 56a, 56b approach mutually to press and close the upper end of the parison 6.

The expansion pins 57a, 57b are arranged below the molds 55a, 55b so as to be movable along the inward and outward direction (opening and closing direction of molds). The expansion pins 57a, 57b move away from each other to expand the lower end of the parison 6.

The method of mounting the bracket 2 using such a manufacturing device includes an setting step, a prison arranging step, a bracket arranging step, a joining step, a removing step and a blowing step.

The setting step sets the bracket 2 on the lifting device 5. In the setting step, the support rod 51 is slid upward by a given length to set the bracket 2 on the upper face of the seat 52. At this time, the supported portion 40 of the bracket 2 is clamped by the clamp mechanism 53 to fix the bracket 2 on the seat 52.

The parison arranging step arranges the parison 6 between the molds 55a, 55b. In the parison arranging step, the chucks 56a, 56b hold the upper end of the parison 6 to suspend the parison 6 between the molds 55a, 55b. Then, the expansion pins 57a, 57b disposed inside the suspended parison 6 are moved away from each other to expand the lower end of the parison 6 so that the lower end is kept open.

The bracket arranging step moves the bracket 2 upward by the lifting device 5 to arrange the bracket 2 at a given position between the molds 55a, 55b. In the bracket arranging step, the support rod 51 is slid upward to insert the bracket 2 from below between the molds 55a, 55b and inside the parison 6.

Figure 6B:
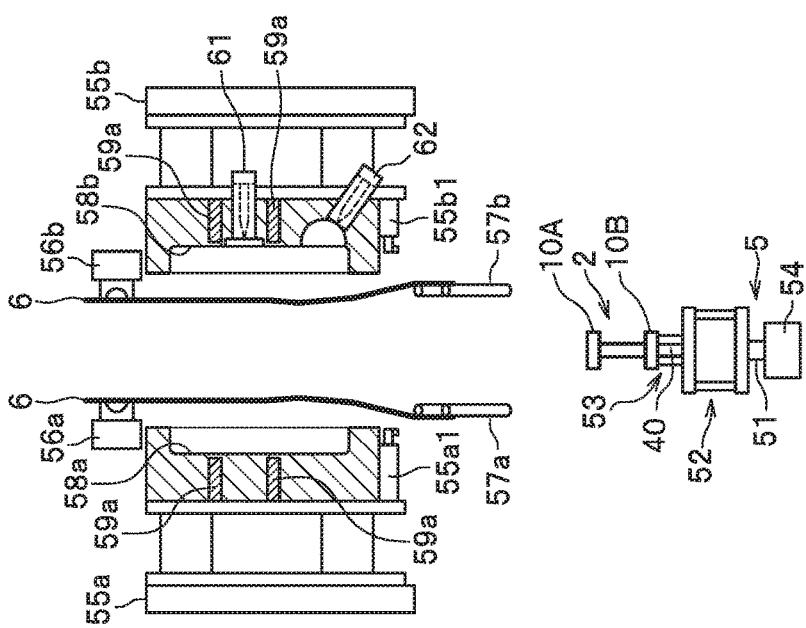

The joining step, as shown in FIG. 6B, joins the bracket 2 to the parison 6. In the joining step, the joining cylinders 59a are extended inward (closing direction of molds) to clamp and press the bracket 2 from outside the parison 6. At this time, the distal ends of the joining cylinders 59a mutually press, and weld pressed portions of the parison 6 and the bracket 2. Thus, the bracket 2 is attached inside the parison 6 (fuel tank body 1) via the welded members 10A, 10B.

The removing step removes the bracket 2 from the lifting device 5. In the removing step, the supported portion 40 of the bracket 2 is released from the clamp mechanism 53, and the support rod 51 is slid downward to retract the seat 52.

The blowing step mold-clamps the molds 55a, 55b for blow molding. Accordingly, the fuel tank T is formed. Note that, in the embodiment, the welded members 10A, 10B are welded inside the parison 6 with the use of the lifting device 5 and the joining cylinders 59a, 59a, but the method is not limited thereto. For example, the welded members 10A, 10B may be welded inside the parison 6 with the use of a robot arm.

According to the embodiment described above, since the stress is dispersed in the welded face 11A onto the second facing sides 11b peripheral to the first facing side 11a, one point in the outer edge of the welded face 11A does not locally receive a large stress. Accordingly, an internal member such as the bracket 2 is prevented from coming off and falling off the fuel tank body 1, so that the fuel tank T having superior durability is obtained.

Further, in the embodiment, the welded member 10A (10B) includes the bottom 11, the body 12 and the flange 13, and the bottom 11 of the welded member 10A (10B) is welded on the first tank face 1a and the flange 13 is welded on the second tank face 1b, respectively. Therefore, the strength of the fuel tank T is improved. Further, in the welded face 13A formed on the flange 13, since the stress is dispersed on the second facing sides 13a2 that face the given point P, one point in the outer edge of the welded face 13A does not receive a large stress. Accordingly, the fuel tank T having more superior durability is obtained.

Still further, the welded area in the welded face 11A of the bottom 11 is approximately the same as the welded area in the welded face 13A of the flange 13, to make the difference in weld strength small between the bottom 11 and the flange 13. Therefore, a good welding balance is provided between the first tank surface 1a and the second tank surface 1b.

Yet further, the communication holes 12a1 and 12b1 that communicates inside and outside the body portion 12 are formed in the body 12, through which the fuel is led into the body 12. Therefore, the inner spaces in the welded members 10A, 10B are suitably used as reservoir spaces for the fuel. Thus, the decrease in volume of the fuel tank body 1 due to arranging the welded members 10A, 10B is minimized, to suitably secure the volume of the fuel tank body 1.

Second Embodiment

A second embodiment of the invention will be described with reference to FIGS. 7A and 7B. The second embodiment is different from the first embodiment in that annular ribs 11R are formed on the welded face 11A before welding. Further, annular ribs 13R are formed on the welded face 13A before welding.

Figure 7A:
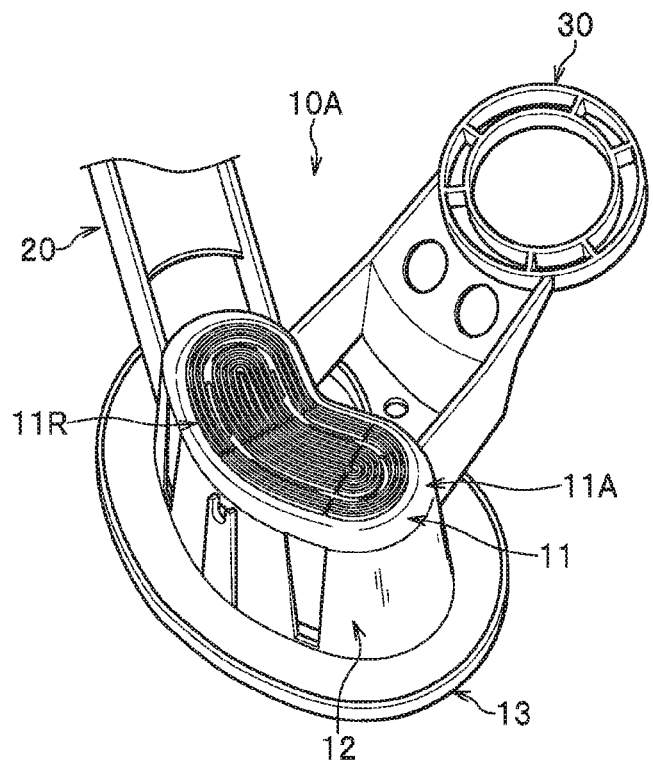
FIG. 7A is a perspective view as viewed from above.
Figure 8A:
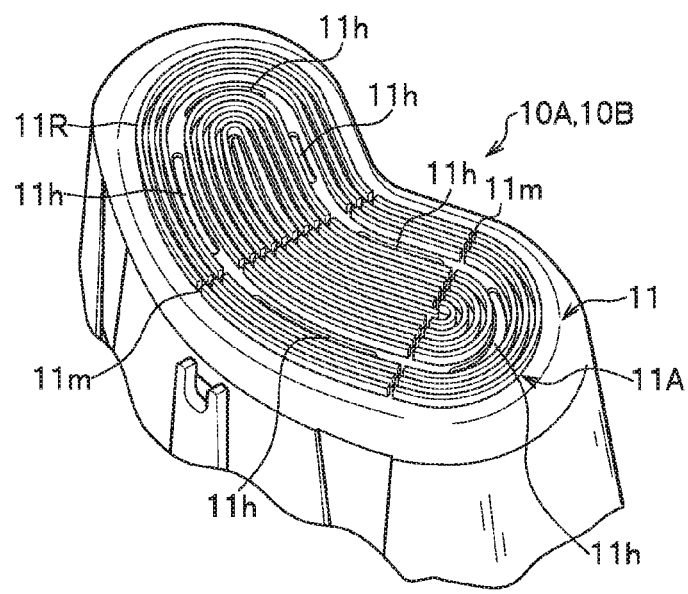
FIG. 8A is an enlarged view of a bottom.

As shown in FIG. 7A, a plurality of ribs 11R are formed to protrude on the welded face 11A of the bottom 11. The ribs 11R are formed at given intervals from the center toward the outer peripheral edge of the welded surface 11A. Each rib 11R is substantially in the same shape and is formed larger toward the outside. Each rib 11R is, as shown in FIG. 8A, divided circumferentially by two notched grooves 11m that are formed in the direction orthogonal to the ribs 11R. Further, a plurality of long holes 11h are formed in the welded face 11A. Each long hole 11h is formed open between the adjacent ribs 11R. Each long hole 11h serves as an air vent hole at the time of welding.

Figure 9A:
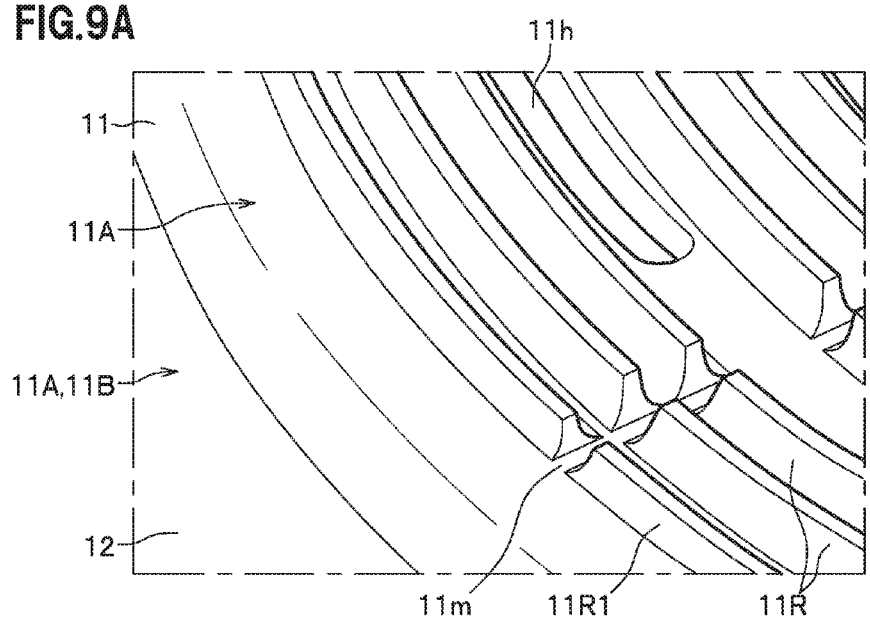
FIG. 9A is an enlarged perspective view and FIG. 9B is an enlarged cross-sectional view, both illustrating ribs formed on a welded face.
Figure 9B:
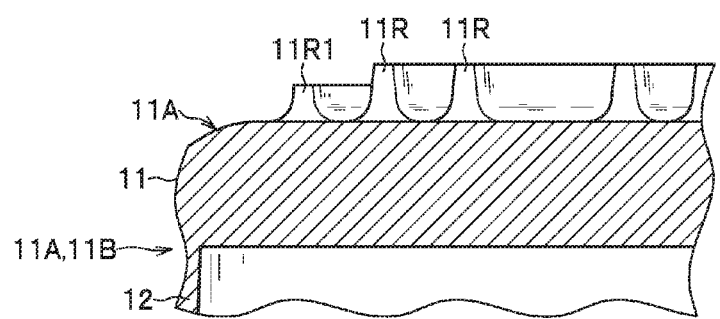

In the embodiment, as shown in FIGS. 9A and 9B, among the plurality of ribs 11R, the rib 11R1 at the outermost is lower than the ribs 11R located closer to the center (inside) with respect to the outermost rib 11R1.

Figure 7B:
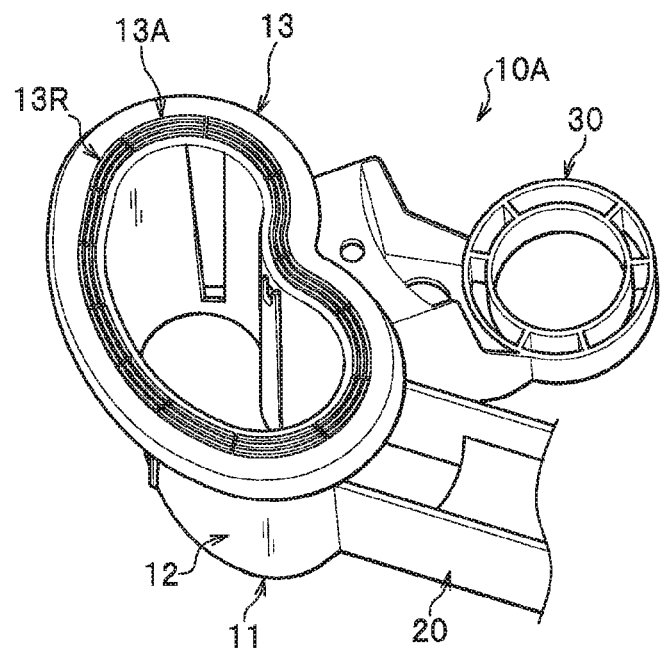
FIG. 7B is a perspective view as viewed from below, of one of welded members provided in a fuel tank according to a second embodiment of the invention.
Figure 8B:
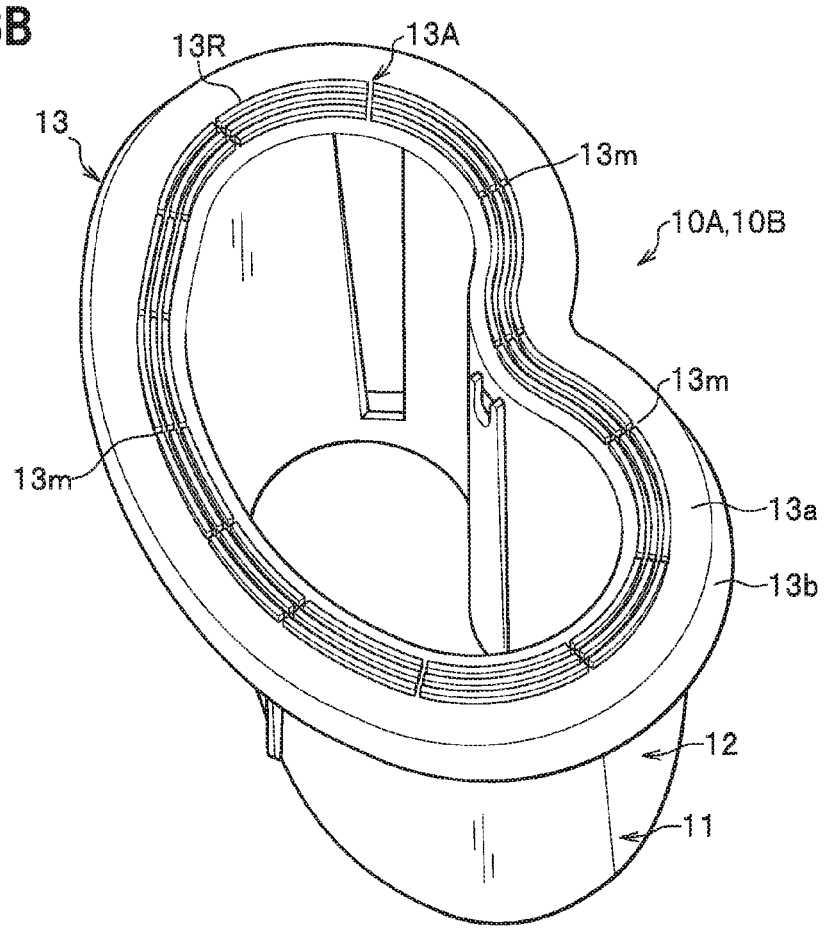
FIG. 8B is an enlarged view of a flange.

On the other hand, as shown in FIG. 7B, a plurality of ribs 13R are formed to protrude on the welded face 13A of the flange 13. Three ribs 13R are formed at given intervals near the inner peripheral edge of the welded face 13A. Each rib 13R is, as shown in FIG. 8B, divided into several pieces circumferentially by a plurality of notched grooves 13m that are formed in the direction orthogonal to the rib 13R. Note that, also in the welded face 13A, the rib 13R at the outermost may be formed to be lower than the ribs 13R at inner side with respect to the outermost rib 13R.

According to the embodiment, the welded area is increased compared with the case having no ribs 11R, 13R, to give more increased weld strength.

Further, the rib 11R1 at the outermost is lower than the ribs 11R at the inner side with respect to the outermost rib 11R1, to allow for reducing the amount of resin run at the outer edge of the welded face 11A as compared with that at the inner side. That is, the strength at the outer edge of the welded face 11A is formed intentionally weaker than that at the inner side. With such a configuration, even if the internal pressure of the fuel tank T is applied to damage the welded face 11A, only the outer edge of the welded face 11A comes off by the damage, to allow for making the damage on the inner face of the fuel tank body 1 small. Further, the notched grooves 11m, 13m improve the fluidity of the resin at the time of welding.

Reference Example

A reference example of the invention will be described with reference to FIGS. 10A and 10B. The reference example is different from the first and second embodiments in that a welded member 10C is formed in a substantially D-shape as viewed from above.

Figure 10A:
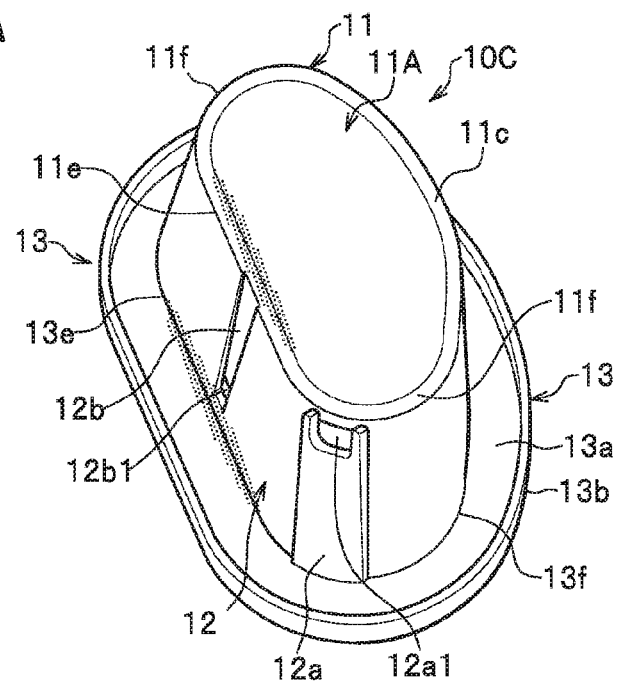
FIG. 10A is a perspective view as viewed from above and FIG. 10B is a perspective view as viewed from below, both illustrating a welded member provided in a fuel tank according to a reference example of the invention.
Figure 10B:
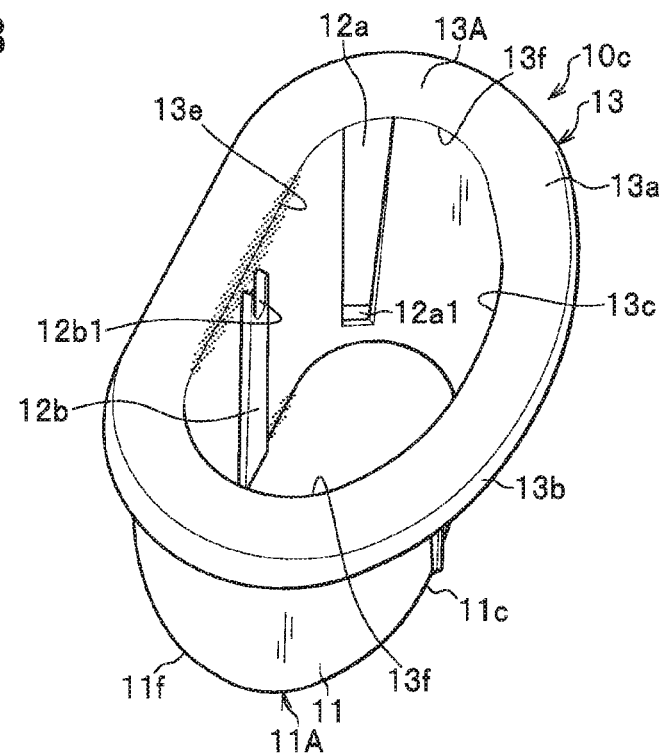

The welded face 11A of the welded member 10C is, as shown in FIGS. 10A and 10B, defined by a linear facing side 11e, substantially semicircular lateral sides 11f continuous to both ends of the linear facing side 11e, and a connecting side 11c that connects the lateral sides 11f to each other and faces the linear facing side 11e.

The welded member 10C is attached in the fuel tank body 1 so that the linear facing side 11e faces the given point P (see FIG. 2) of the fuel tank body 1. Note that the positional relationship between the given point P and the welded member 10C is preferably set so that the given point P is positioned (faced) in an area defined by a normal line (not shown) passing through one end and a normal line (not shown) passing through the other end of the linear facing side 11e.

In such the welding member 10C, the stress is applied on the welded face 11A of the bottom 11 along the linear facing side 11e facing the given point P, as shown by the dot patterns in FIGS. 10A and 10B. In short, the stress is dispersed approximately all over the linear facing side 11e.

Further, also in the welded face 13A of the flange 13, the stress is applied along the linear facing side 13e. In short, the stress is dispersed approximately all over the linear facing side 13e.

According to the reference example described above, in the welded state, since the stress is dispersed on the linear facing side 11e that faces the given point P, one point in the outer edge of the welded face 11A never receives a large stress locally. Similarly, the stress is also dispersed on the linear facing side 13e of the welded face 13A of the flange 13. Therefore, the fuel tank T having superior durability is obtained.

Though the embodiments of the invention have been described above, the invention is not limited to the embodiments described above, and, for example, the invention may be variously modified as follows.

For example, in each embodiment described above, the welded face 11A is welded on the first tank face 1a and the welded face 13A is welded on the second tank face 1b. However, the position may be reversed to weld the welded face 13A on the first tank face 1a and to weld the welded surface 11A on the second tank face 1b.

Further, in the welded members 10A to 10C, the stress described above may be dispersed on only the face to be welded on one of the first tank face 1a and the second tank face 1b.

Note that, in the first and second embodiments, though the bracket 2 includes the welded members 10A, 10B connected by the wave-dissipation plate 20, the configuration of the bracket 2 is not limited thereto and the welded members 10A, 10B alone may be arranged.

Still further, in the first embodiment, though both the welded members 10A, 10B are arranged to face the given point P, the configuration is not limited thereto and only one of the welded members 10A, 10B may be arranged to face the given point P.

Yet further, in the first and second embodiments, though only one first facing side 11a is formed, the configuration is not limited thereto and a plurality of first facing sides 11a may be formed. For example, in a case where two first facing sides 11a are formed, at least three second facing sides 11b can be formed so as to be adjacent to each first facing side 11a, to disperse the stress more suitably. In addition, in a case where three first facing sides 11a are formed, at least four second facing sides 11b can be formed so as to be adjacent to each first facing side 11a, to disperse the stress still more suitably.

Moreover, in the embodiments, the bracket 2 is illustrated as an internal member, but the invention may be applied when various valves or and/or internal members such as a wave-dissipation plate and a clip are welded on the inner face of the fuel tank body 1. Also in this case, a welded face for welding may be provided on at least one of the first tank face 1a and the second tank face 1b that face with each other.

Finally, though the welded area in the welded face 11A of the bottom 11 is set to have approximately the same welded area in the welded face 13A of the flange 13, the configuration is not limited thereto and either one may be set to have a larger welded area than the other.

EXPLANATION OF REFERENCES 1 fuel tank body
1a first tank face
1b second tank face
2 bracket
10A welded member
10B welded member
10C welded member
11 bottom
11R1 rib (at the outermost)
11A welded face
11R rib
11a first facing side (facing side)
11b second facing side
11c connecting side
11e linear facing side
12 body
12b1 communication hole
12a1 communication hole
13 flange
13a2 second facing side
13A welded face
13R rib
13e linear facing side
P given point
T fuel tank

The invention claimed is:

1. A fuel tank comprising a welded member that is welded inside a fuel tank body,
   wherein the welded member includes a welded face that is welded on at least one of a first tank face and a second tank face which faces the first tank face, of the fuel tank body, and
   wherein the welded face is in a kidney-shape defined by a first facing side in a concave shape that faces a given point determined based on a displacement of distance between the first tank face and the second tank face when the fuel tank body receives an internal pressure, a pair of second facing sides in a convex shape that are continuous to both ends in an extending direction of the first facing side and relatively protrude toward the given point with respect to the first facing side, and a connecting side that is curved in a same orientation as the first facing side and connects the pair of second facing sides to each other.

2. The fuel tank according to claim 1,
wherein the welded member includes:
a bottom;
a cylindrical body continuous to the bottom; and
an annular flange that extends laterally from an end of the body,
wherein the bottom includes the welded face that is welded on one of the first tank face and the second tank face, and
wherein the flange includes the welded face that is welded on the other of the first tank face and the second tank face.

3. The fuel tank according to claim 2, wherein a welded area of the bottom is approximately the same as a welded area of the flange.

4. The fuel tank according to claim 2, wherein a communication hole through which an inside and an outside of the body communicates to each other is formed in the body.

5. The fuel tank according to claim 1, wherein ribs that protrude from the welded face are formed on the welded face before welding.

6. The fuel tank according to claim 5, wherein the ribs are formed in parallel to each other outward from a center of the welded face, and an outermost rib is lower than the ribs formed inside the outermost rib.

* * * * *